May 10, 1938. A. A. BERNARD 2,117,077
TAKE-OFF APPARATUS FOR ELECTRIC WELDERS
Filed March 12, 1937 4 Sheets-Sheet 4

Patented May 10, 1938

2,117,077

UNITED STATES PATENT OFFICE 2,117,077

TAKE - OFF APPARATUS FOR ELECTRIC WELDERS

Arthur A. Bernard, Chicago, Ill., assignor to Hollup Corporation, Chicago, Ill., a corporation of Illinois Application March 12, 1937, Serial No. 130,479

13 Claims. (Cl. 105—177)

My invention relates, generally, to transportation apparatus and it has particular relation to apparatus for transporting welding or like apparatus along a railroad track and for removing it therefrom.

It is becoming of increasing importance to provide for moving a power plant along a railroad track and for removing it therefrom and placing it alongside thereof in order to permit its use at any desired point. For example, internal combustion engine driven air compressors are constructed as units and are moved from point to point along a railroad track for cleaning the ballast, tamping ties and other work in which compressed air is employed. Likewise internal combustion engine driven arc welding generators are constructed as units and are arranged to be transported along the railroad track and to be removed therefrom for welding rail ends, frogs, crossovers and the like. While this invention is particularly directed to the provision of means for transporting welding apparatus along and removing it from a railroad track, it will be understood that it may be employed in connection with other similar apparatus such as air compressors for handling such units in a similar manner.

Apparatus for transporting welding equipment or the like along the railroad track and removing it therefrom must be so constructed that it may be easily handled, preferably by not more than two persons. When the point is reached at which it is desired to remove the apparatus from the track, a minimum of time should be required in setting up the structure onto which the welding apparatus is to be moved and likewise a minimum of time should be required for removing the welding or like apparatus from the railroad track. The necessity for speed will be obvious when it is recalled that trains normally operate along the railroad tracks and their movements should not be interfered with.

Accordingly, the object of my invention, generally stated, is to provide a take-off structure and a carriage for transporting welding or like apparatus along and moving it from and to a railroad track that shall be simple and efficient in operation, light in weight and which may be readily and economically manufactured and installed.

An important object of my invention is to provide for taking off welding or like apparatus from a carriage intended to run on a railroad track at practically any location along it.

Another important object of my invention is to provide for supporting welding or like apparatus on a carriage adapted to run along a railroad track in such manner that it may be readily rolled off of the carriage onto an adjacent take-off structure as soon as the latter is placed in position.

Still another important object of my invention is to so construct a carriage and take-off structure for welding or like apparatus that it may be readily handled by two persons with a minimum of delay in moving the apparatus to the take-off structure and then removing the carriage from the railroad track.

An object of my invention is to hold the take-off structure in fixed relation to the adjacent rail of the railroad track.

A further object of my invention is to provide readily detachable track sections for interconnecting either end of the track on the carriage with the track on the take-off structure.

Still another object of my invention is to provide for readily adjusting the end of the take-off structure remote from the adjacent rail in order to place the track carried thereby at the desired level regardless of the elevation of the ground upon which the take-off structure is mounted.

Other objects of my invention will, in part, be obvious and in part appear hereinafter.

My invention, accordingly, is disclosed in the embodiment hereof shown in the accompanying drawings, and it comprises the features of construction, combination of elements and arrangement of parts which will be exemplified in the construction hereinafter set forth, and the scope of the application of which will be indicated in the appended claims.

For a more complete understanding of the nature and scope of my invention, reference may be had to the following detailed description taken in connection with the accompanying drawings, in which.

According to my invention I have provided a carriage with wheels that are adapted to run along the railroad track and a take-off structure that is adapted to be mounted alongside of the railroad track at the point where it is desired to place the welding or like apparatus carried by the carriage. The carriage is formed of tubular frame members in order to provide a rigid construction and at the same time a light weight construction that will permit its being handled by two persons. The frame between the wheels of the carriage is underslung in order to place the transverse tubular track members carried thereby at the lowest level consistent with the required clearance between the carriage and the railroad track and at the same time to register with corresponding tubular track members carried by the take-off structure which it is desired to position at as low a level as possible in order to position the welding apparatus out of the path of trains that move along the railroad track. In order to interconnect the two pairs of track members on the carriage and on the take-off structure a pair of removable tubular track members is provided and they are arranged to have telescopic engagement with either end of the track members on the carriage to permit positioning of the take-off structure on either side of the railroad track.

The frame of the welding or like apparatus is provided with wheels that rest directly upon the transverse track members on the carriage. It is then unnecessary to jack up or otherwise lift the welding apparatus relative to the carriage for removal therefrom. As soon as the take-off structure has been clamped into position adjacent the railroad track and the removable track members placed in position, the welding apparatus may be readily rolled off of its carriage onto the take-off structure. The removable track members are then taken out of position and the carriage lifted off of the railroad track. Tests have shown that approximately two minutes are required to set up the take-off structure and remove the welding apparatus weighing approximately three thousand pounds from the carriage onto the take-off structure and then removing the carriage from the railroad track. Only two persons were required to effect this operation.

Figures 1, 10:
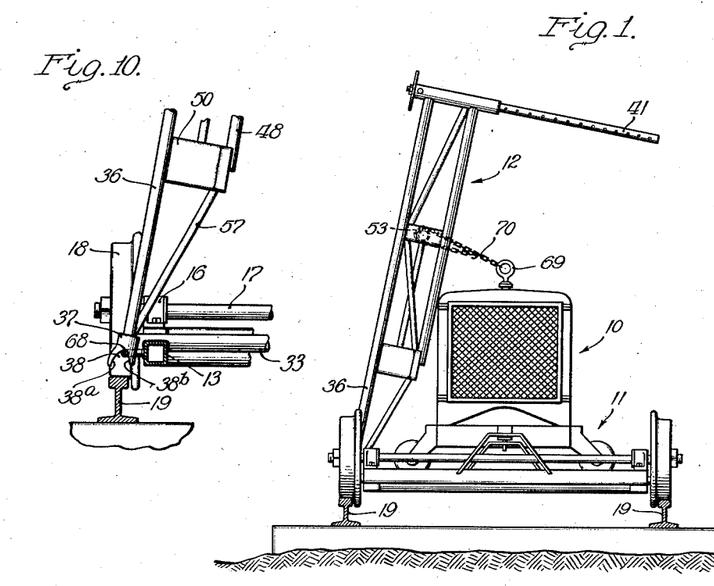
Figure 1 is a view, in front elevation, of an internal combustion engine driven welding set mounted on a carriage adapted to run along a railroad track with the take-off structure mounted thereon.
Figure 10 is a detail sectional view taken along the line 10—10 of Figure 7 and showing how the take-off structure is mounted on the carriage while it is being transported along the railroad track.
Figure 2:
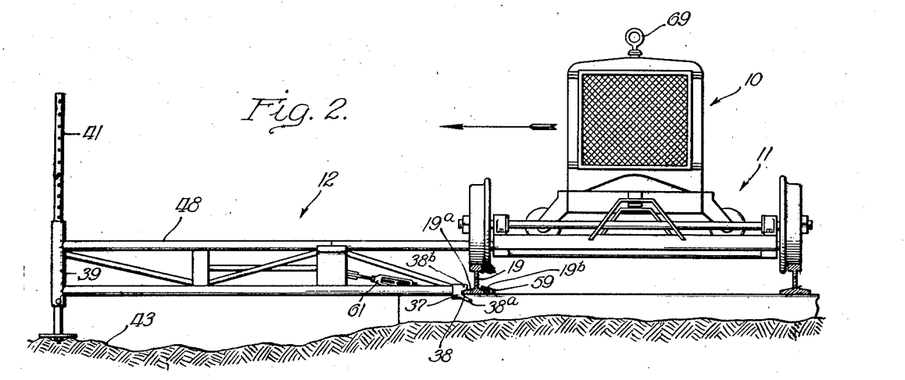
Figure 2 is a view similar to Figure 1 but showing the take-off structure mounted in operative position for receiving the welding apparatus.

Referring now particularly to Figure 1 of the drawings, it will be observed that the reference character 10 designates, generally, an internal combustion engine driven welding set that is mounted on a carriage, shown generally at 11, which has mounted along one side a take-off structure, shown generally at 12. While the set 10 has been indicated as being a welding set it will be understood that any other like apparatus may be employed in practicing my invention. The welding set 10 has been shown for illustrative purposes only. In Figure 2 of the drawings the take-off structure 12 has been shown in a typical position in which it may be placed for receiving the welding set or apparatus 10 from the carriage 11. The apparatus 10 would be moved in the direction indicated by the arrow when the take-off structure 12 is located as shown in this figure of the drawings.

Figures 4, 5, 6:
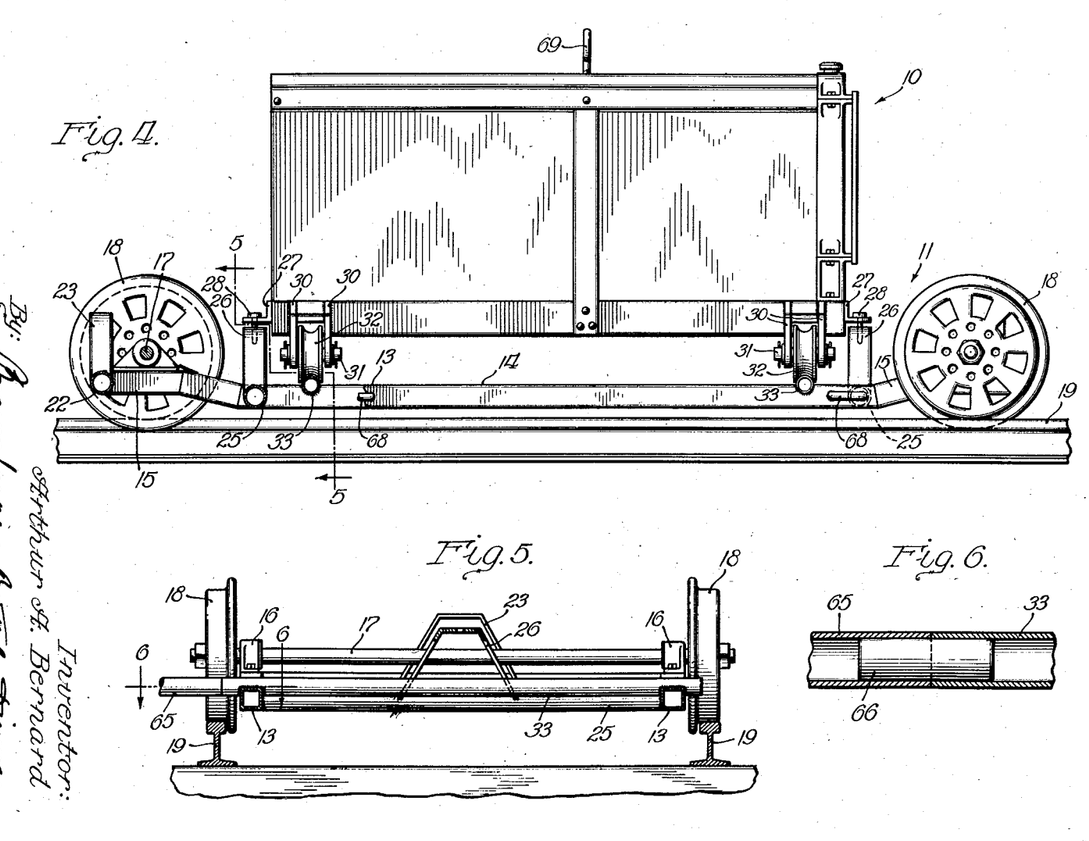
Figure 4 is a view, in side elevation, of the carriage, certain parts being shown in section in order to more clearly illustrate the invention.
Figure 5 is a detail sectional view generally along the line 5—5 of Figure 4.
Figure 6 is a detail sectional view generally along the line 6—6 of Figure 5.
Figure 7:
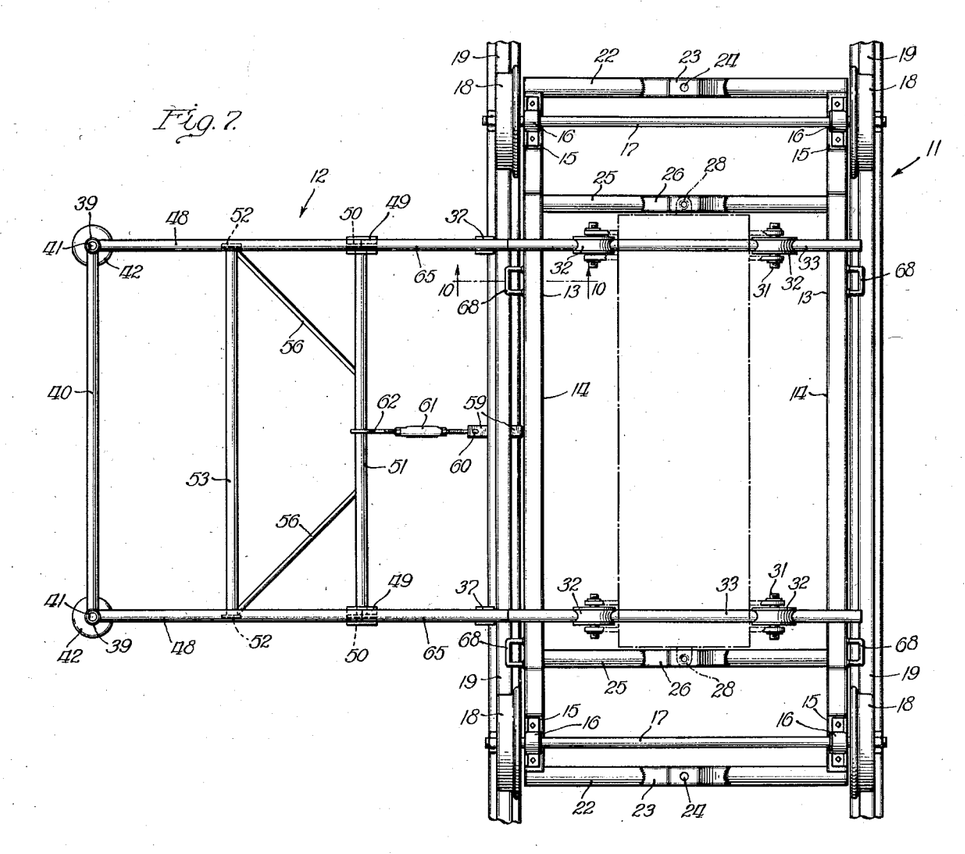
Figure 7 is a top plan view of the carriage and take-off structure mounted in operative relation, the welding apparatus being shown in outline only.

The details of construction of the carriage 11 are shown more clearly in Figures 4, 5 and 7 of the drawings, to which reference will now be had. As there shown the carriage 11 comprises a pair of tubular side frame members 13 having rectangular cross sections in order to provide the required strength and to facilitate the adaptation thereof in the construction of the carriage. The intermediate portions 14 of the side frame members 13 are lower than the end portions 15 in order to provide an underslung construction for a purpose that will presently be apparent. The side frame members 13 are each formed from a continuous length of rectangularly shaped tubing and portions adjacent the ends are removed and the remaining edges abutted and welded in order to provide the offset end portions 15 and the underslung intermediate portions 14. On the offset end portions 15 bearings 16 are mounted and secured thereto by any suitable means such as by bolts and they are adapted to receive axles 17 on the ends of which flanged wheels 18 are mounted for running along rails 19 of a railroad track. Transverse end frame members 22 extend between the ends of the side frame members 13. The end frame members 22 are tubular in shape, as illustrated, and the ends of the side frame members 13 are correspondingly recessed to receive them. They are welded in position.

With a view to attaching the carriage 11 to a suitable propelling device, such as the internal combustion engine driven car of a section gang, coupling members 23, in the form of inverted U-shaped members are welded to the upper side of each of the transverse end members 22. An aperture 24 is provided in each of the coupling members 23 to permit the insertion of a draw pin or other suitable coupling means, as will be readily understood.

In order to further brace the side frame members 13 and to provide a more rigid frame for the carriage 11 intermediate transverse frame members 25 are provided. The intermediate transverse frame members 25 are tubular in form and they abut the inner sides of the side frame members 13 and are welded thereto.

The welding apparatus 10 may be secured in position on the carriage 11 by coupling members 26 that may be similar to the coupling members 23, previously described. At the ends of the frame of the welding apparatus 10 angle brackets 27 are provided having suitable apertures registering with corresponding apertures in the coupling members 26. Pins 28 that are readily removable are arranged to be positioned in these registering apertures for preventing sidewise movement of the welding apparatus 10. It will be understood that the coupling members 26 are welded to the tubular intermediate transverse frame members 25. While this particular means has been illustrated for holding the welding apparatus in position, it will be understood that any other suitable means may be provided without departing from the scope of this invention.

Adjacent each corner of the lower frame of the welding apparatus 10 a pair of plates 30 is welded in spaced apart relation for receiving a shaft 31 between the outer ends thereof. The shafts 31 may be held in position by suitable cotter pins and they have mounted thereon wheels 32 having grooved peripheries for running on a pair of transverse track members 33. The track members 33 are of tubular construction and they are arranged to interfit with the upper surfaces of the intermediate portions 14 of the side frame members 13 and they are welded thereto.

While the welding apparatus 10 is being transported on the carriage 11 it is supported on the transverse track members 33. It is held in a central position by the pins 28 interfitting with the coupling members 26 and the angle brackets 27. As soon as the pins 28 are removed the welding apparatus 10 may be rolled along the transverse track members 33.

Because of the tubular frame construction of the carriage 11 it is relatively light in weight and may be readily handled by two persons. At the same time its construction is sturdy and it is amply capable of transporting the welding apparatus 10 along the railroad track and withstanding the shocks that are ordinarily incident thereto.

Figures 3, 8, 9:
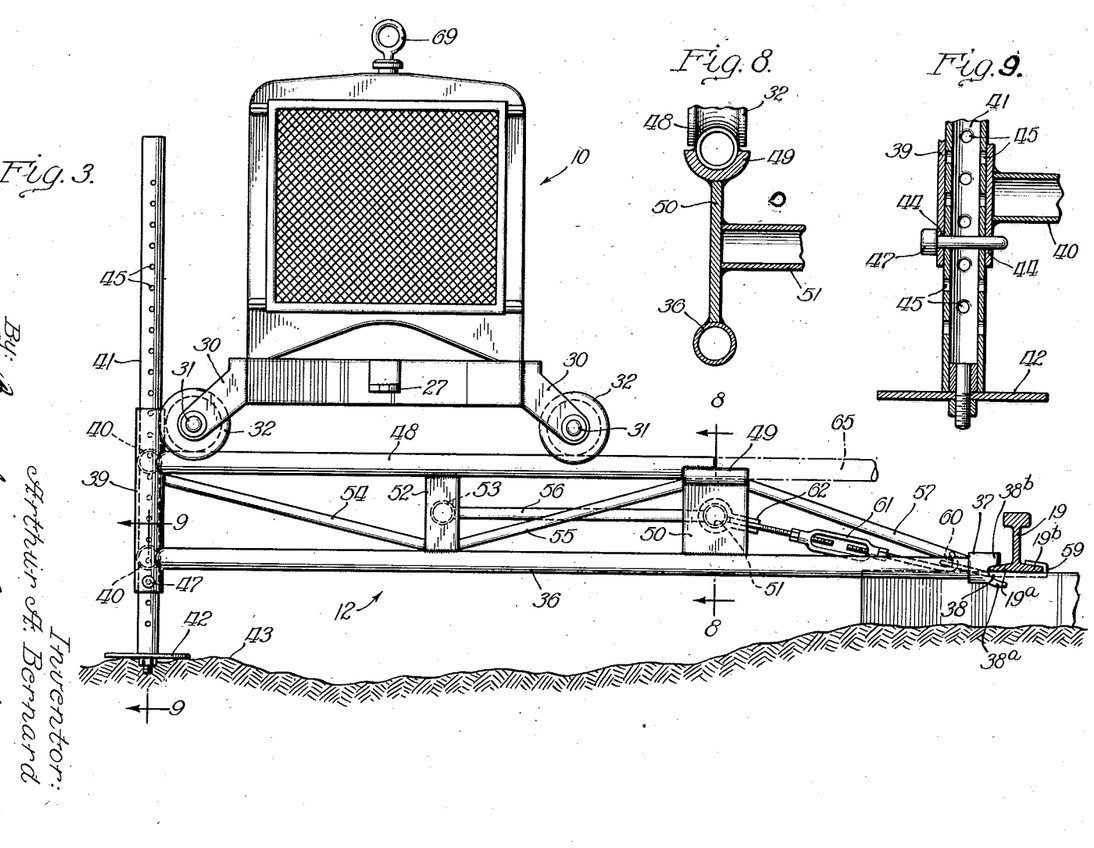
Figure 3 is a view, in side elevation, of the take-off structure with the welding apparatus mounted thereon.
Figure 8 is a detail sectional view taken along the line 8—8 of Figure 3.
Figure 9 is a detail sectional view taken along the line 9—9 of Figure 3.

In Figures 3 and 7 of the drawings the details of construction of the take-off structure 12 are more clearly illustrated. As there shown the take-off structure 12 is formed by a pair of side frame members 36 that terminate in foot members 37, the ends of which are provided with slots 38 for interfitting with the adjacent flange 19a of the adjacent rail 19. The lower lip 38a of each of the slots 38 is curved, as illustrated, while the upper lip 38b conforms to the upper surface of the flange 19a. This construction permits the take-off structure 12 to be readily hinged about the rail 19 for moving it into or out of operative position. The side frame members 36 are of tubular construction and are welded at the other ends to corner posts 39 which are of hollow tubular construction. Transverse end frame members 40 extend between the corner posts 39 and are welded thereto with a view to providing for adjusting the end of the take-off structure 12 remote from the rail 19. Adjustable support members 41 in the form of tubular members are slidably mounted in the tubular corner posts 39. Foot plates 42 in the form of discs of metal are secured to the lower ends of the support members 41 to prevent them sinking into the ground 43. The manner in which the support members 42 are adjustably mounted in the corner posts 39 is more clearly shown in Figure 9 of the drawings. As there shown each corner post 39 is provided with alined apertures 44 near its lower end while each of the support members 41 is provided with a plurality of alined apertures 45. In order to provide a maximum number of apertures 45 in the support members 41 and to prevent weakening it, these apertures are mounted in staggered relation. That is, each set of alined apertures 45 is located 90° from the adjacent set of apertures. Since the support members 41 are slidably mounted in the corner posts 39 and also can rotate therein, any set of apertures 45 may be alined with the apertures 44 in the corner post 39. Pins 47 are provided for extending through the registering apertures 44 and 45 for holding the support members 41 in fixed relation relative to the corner posts 39.

In order to provide for receiving the welding apparatus 10 a pair of tubular track members 48 is mounted on the take-off structure 12. These track members are mounted above and parallel to the side frame members 36. The left hand ends of the tubular track members 48 are welded to the corner posts 39. The right hand ends are positioned in and welded to yokes 49 that in turn are welded to the upper sides of plates 50, the lower sides of which are welded to the upper surfaces of the side frame members 36. The details of this construction are more clearly shown in Figure 8 of the drawings. The yokes 49 may be formed by longitudinally cutting in two a suitable length of pipe the inner diameter of which is the same as the outside diameter of the track members 48. A tubular transverse frame member 51 extends between the plates 50 and the ends thereof are welded thereto to further brace the take-off structure and for another purpose which will presently be apparent.

Relatively narrow plates 52 are positioned between the side frame members 36 and the track members 48 intermediate their ends for further bracing the take-off structure 12 and a tubular transverse frame member 53 is positioned therebetween and the ends are welded to these plates. Angle braces 54 and 55, in the form of tubular members are positioned between the plates 52 and the corner posts at one end and the plates 50 at the other and welded thereto. Additional angle braces 56 in the form of tubular members are positioned between the junctions between the transverse frame member 53 and the plates 52 and the transverse frame member 51 for further bracing the take-off structure 12. Additional angle braces 57 are positioned between the plates 50 and the ends of the side frame members 36 adjacent the foot members 37 and welded thereto.

It is desirable that the take-off structure 12 be firmly held in the position shown in Figure 3 of the drawings with the foot members 37 in abutting relation with the flange 19a of the rail 19. In order to insure that this relationship will be maintained a J-shaped hook member 59 is provided for interfitting with the remote flange 19b of the rail 19 between the foot members 37, as shown in Figure 7. A suitable aperture is provided in the straight end of the hook member 59 for receiving the hook 60 of a turnbuckle assembly 61. An eye 62, formed by shaping a rod to the shape shown in Figure 3, is slidably mounted on the transverse frame member 51 and the left hand end of the turnbuckle assembly is positioned therebetween and welded thereto. When the turnbuckle assembly 61 is tightened in position, the take-off structure 12 is firmly held in place.

It is necessary to provide a connecting link between the track members 33 on the carriage 11 and the track members 48 on the take-off structure 12. For this purpose removable track members 65 are provided and, as shown in Figure 6 of the drawings, each of them is provided with a plug 66 that is arranged to telescope with either end of the track members 33 on the carriage 11. The other ends of the removable track members 65 are positioned in the yokes 49, thereby providing a continuous track on which the wheels 32 may run for moving the welding apparatus 10 between the carriage 11 and the take-off structure 12. As soon as the welding apparatus 10 has been moved onto the take-off structure 12, the track members 65 may be removed from the ends of the track members 33 and the carriage 11 then removed from the rails 19. If desired, the carriage 11 may be turned on its side and supported on the take-off structure and by the welding apparatus 10. In this position one of the side frame members 13 would be placed transversely across the track members 48 and the carriage would lean against one side of the welding apparatus 10.

Provision is made for carrying the take-off structure 12 on the carriage 11 by providing U-shaped support members 68 that may be formed by suitably shaping round rods with the intermediate portions substantially at right angles to the end portions. These support members are welded to the outer sides of the side frame members, as shown in Figure 10 of the drawings, in such spaced relation as to receive the slots 38 of the foot members 37. This spacing is the same as that between the side frame members 36. The take-off structure 12 may be held in the upright position by any suitable means such as by fastening it to a lift ring 69 that is provided on top of the welding apparatus 10 by a chain 70. Since the support members 68 are mounted on the underslung portions 14 of the side frame members 13, the take-off structure 12 need be moved only a little distance to place the foot members 37 into engagement with the adjacent flange 19a of the adjacent rail and vice versa. It will be understood that any other suitable means may be provided for mounting the take-off structure 12 for transportation as well as any other means for holding in position.

In operation, when the point has been reached where it is desired to remove the welding apparatus 10, the chain 70 is disconnected and the take-off structure 12 may be removed from its position as shown in Figure 1 of the drawings and positioned alongside of the track as shown in Figure 2. The foot members 37 are positioned in abutting relation with the adjacent flange 19a of the adjacent rail 19 and the support members 41 are adjusted in the corner posts 39 to place the track members 48 at the desired level. Because of the curved lower lips 38a of slots 38, the take-off structure 12 may be readily hinged about the flange 19a as will be readily understood. Furthermore, only one person is required to swing the take-off structure 12 into and out of operative position. The support members 41 are preferably adjusted so that the track members 48 will slope slightly from the railroad track, thereby insuring that the welding apparatus 10 will not roll off of the track members 48. The corner posts 39 serve as stops for preventing the welding apparatus 10 from rolling off of the track members 48 in the opposite direction. The J-shaped hook member 59 is positioned over the remote flange 19b of the rail 19 and the hook 60 of the turnbuckle assembly 61 is positioned therein.

The turnbuckle assembly 61 is then tightened to securely hold the take-off structure 12 in place. The removable track members 65 are then telescoped with the adjacent ends of the track members 33 on the carriage 11 and, as soon as the pins 28 are removed, the welding apparatus 10 may be rolled directly from the carriage 11 to the take-off structure 12. It will be observed that, when the construction herein disclosed is employed, it is unnecessary to jack up the welding apparatus 10 or otherwise move it in a vertical direction relative to the carriage 11 in order to permit its movement off of the carriage. As soon as the welding apparatus 10 has been moved onto the take-off structure 12, the removable track members 65 are taken out of the ends of the track members 33 and the carriage 11 is then lifted off of the rails 19. As indicated hereinbefore, the carriage 11 may be placed on the take-off structure and leaned against the welding apparatus so that the entire apparatus will occupy a minimum of space. It will be understood that this sequence of operations is substantially reversed in order to place the welding apparatus 10 and the take-off structure 12 on the carriage 11 for transportation to another point.

It will be observed that the welding apparatus 10 may be taken off of either side of the carriage 11 to be positioned along either side of the railroad track. That is, the take-off structure 12 may be positioned on either side of the right of way and the removable track members are then positioned in the corresponding ends of the track members 33 on the carriage 11 to permit the removal of the welding apparatus 10 from the carriage 11.

Because of the tubular frame construction, the weight of the carriage 11 and the take-off structure 12 is reduced to a minimum while still providing the required strength and rigidity. As a result it is possible for two persons to handle either of these devices with little difficulty and, ordinarily, only one person is required to handle the take-off structure.

Since certain changes may be made in the above construction and different embodiments of the invention may be made without departing from the scope thereof, it is intended that all matter contained in the above description or shown in the accompanying drawings shall be entrusted as illustrative and not in a limiting sense.

I claim as my invention:

1. Means for removing welding or like apparatus from a railroad track to a position alongside comprising, in combination, a carriage disposed to run on said railroad track, a pair of track members transversely mounted on said carriage, wheels mounted on said apparatus and disposed to run on said transverse track members, a take-off structure disposed to be removably positioned alongside of said railroad track, a pair of track members mounted on said take-off structure for alignment with said track members on said carriage, and a pair of removable track members disposed to telescope with one of said pairs of track members and to be positioned in alignment with the other of said pairs of track members whereby said apparatus is movable from said carriage onto said take-off structure and vice versa.

2. Means for transporting welding or like apparatus along and moving it from and to a railroad track comprising, in combination, an underslung carriage disposed to run on said railroad track, a pair of track members transversely mounted on said carriage intermediate its ends, wheels mounted on said apparatus for running on said transverse track members, said transverse track member supporting said apparatus while it is being transported on said carriage, a take-off structure disposed to be removably positioned alongside of said railroad track, a pair of track members mounted on said take-off structure for alignment with said track members on said carriage, and a pair of removable track members disposed to have telescopic engagement with either end of the pair of track members on said carriage and to be aligned with the pair of track members on said take-off structure whereby said apparatus is movable from and to said carriage onto and off of said take-off structure on either side of said railroad track.

3. Means for removing welding or like apparatus from a railroad track to a position alongside comprising, in combination, a carriage disposed to run on said railroad track, a pair of track members transversely mounted on said carriage, wheels mounted on said apparatus and disposed to run on said transverse track members, a take-off structure disposed to be removably positioned alongside of said railroad track, means detachably interconnecting said take-off structure and the adjacent rail of said railroad track for holding them in fixed relation, a pair of track members mounted on said take-off structure, and a pair of removable track members interconnecting said pairs of track members whereby said apparatus is movable from and to the track members on said carriage to and from the track members on said take-off structure.

4. Means for transporting welding or like apparatus along and moving it from and to a railroad track comprising, in combination, an underslung carriage disposed to run on said railroad track, a pair of track members transversely mounted on said carriage intermediate its ends, wheels mounted on said apparatus for running on said transverse track members, said transverse track members supporting said apparatus while it is being transported on said carriage, a take-off structure disposed to be removably positioned alongside of said railroad track, holding means detachably interconnecting said take-off structure and the adjacent rail of said railroad track for holding the former in fixed relation relative to the latter, a pair of track members mounted on said take-off structure in alignment with said track members on said carriage, and a pair of removable track members disposed to have telescopic engagement with either end of the pair of track members on said carriage for interconnecting them with the pair of track members on said take-off structure whereby said apparatus is movable along said track members from said carriage to said take-off structure and from said take-off structure to said carriage.

5. Means for removing welding or like apparatus from a railroad track to a position alongside comprising, in combination, a carriage disposed to run on said railroad track, a pair of track members transversely mounted on said carriage, wheels mounted on said apparatus and disposed to run on said transverse track members, a take-off structure disposed to be removably positioned alongside of said railroad track, means on said take-off structure for interfitting with one of the rails of said railroad track, means for holding said take-off structure in fixed relation relative to said railroad track, a pair of track members mounted on said take-off structure, and a pair of removable track members for interconnecting said pairs of track members whereby said apparatus may be rolled back and forth between said carriage and said take-off structure.

6. Means for transporting welding or like apparatus along and moving it from and to a railroad track comprising, in combination, an underslung carriage disposed to run on said railroad track, a pair of track members transversely mounted on said carriage intermediate its ends, wheels mounted on said apparatus for running on said transverse track members, said transverse track members supporting said apparatus while it is being transported on said carriage, a take-off structure disposed to be removably positioned alongside of said railroad track, a pair of slotted foot members on said take-off structure for interfitting with the flange of the adjacent rail of said railroad track, adjustable holding means detachably interconnecting said take-off structure and adjacent rail for holding the former in definite relation relative to the latter, a pair of track members on said take-off structure in alignment with said track members on said carriage, and a pair of removable track members disposed to have telescopic engagement with either end of the track members on said carriage for interconnecting said pairs of track members whereby said apparatus may be rolled between said carriage and said take-off structure.

7. Means for removing welding or like apparatus from a railroad track to a position alongside comprising, in combination, a carriage disposed to run on said railroad track, a pair of track members transversely mounted on said carriage, wheels mounted on said apparatus and disposed to run on said transverse track members, detachable means interconnecting said apparatus and said carriage for holding the former in fixed position on the latter during movement along said railroad track, a take-off structure disposed to be removably positioned alongside of said railroad track, means on said take-off structure for interfitting with the adjacent rail of said railroad track, means for holding said take-off structure in fixed relation relative to said railroad track, a pair of track members mounted on said take-off structure, adjustable support means cooperating with the end of said take-off structure remote from said railroad track for adjusting the pair of track members carried thereby to substantially the same height as the pair of track members on said carriage, and a pair of removable track members for interconnecting said pairs of track members whereby said apparatus may be rolled back and forth between said carriage and said take-off structure.

8. Means for transporting welding or like apparatus along and moving it from and to a railroad track comprising, in combination, an underslung carriage disposed to run on said railroad track, a pair of track members transversely mounted on said carriage intermediate its ends, wheels mounted on said apparatus for running on said transvers track members, said transverse track members supporting said apparatus while it is being transported on said carriage, readily movable means interconnecting said apparatus and said carriage for holding the former in fixed position on the latter during transportation, a take-off structure disposed to be removably positioned alongside of said railroad track, a pair of slotted foot members on said take-off structure for interfitting with the flange of the adjacent rail of said railroad track, adjustable holding means detachably interconnecting said take-off structure and said adjacent rail for holding the former in definite relation relative to the latter, a pair of track members on said take-off structure in alignment with said track members on said carriage, adjustable support means telescopically cooperating with the end of said take-off structure remote from said railroad track for adjusting said pair of track members carried thereby to substantially the same height as the pair of track members on said carriage, and a pair of removable track members disposed to have telescopic engagement with either end of the track members on said carriage for interconnecting said pairs of track members whereby said apparatus may be rolled between said carriage and said take-off structure.

9. Means for transporting welding or like apparatus mounted on wheels along and moving it from and to a railroad track comprising, in combination; a carriage including a pair of tubular side frame members with the intermediate portions below the level of the end portions, wheel and axle assemblies mounted on the upper sides of said end portions for running on said railroad track, tubular transverse frame members interconnecting said side frame members, and a pair of tubular track members mounted in and extending across the upper sides of said intermediate portions on which said apparatus is supported during transportation; and a take-off structure disposed to be positioned on either side of said railroad track including a pair of tubular side frame members disposed to abut the adjacent rail of said railroad track and to extend at right angles therefrom, tubular transverse frame members interconnecting said last named side frame members, a pair of tubular track members mounted above said last named side frame members and in alignment with said first named pair of track members to permit rolling of said apparatus between said carriage and said take-off structure, and a pair of adjustable tubular support members at the end of said take-off structure remote from said railroad track for adjusting the pair of track members carried thereby to substantially the same height as the pair of track members on said carriage.

10. Means for transporting welding or like apparatus mounted on wheels along and moving it from and to a railroad track comprising, in combination; a carriage including a pair of tubular side frame members with the intermediate portions below the level of the end portions, wheel and axle assemblies mounted on the upper sides of said end portions for running on said railroad track, tubular transverse frame members interconnecting said side frame members, and a pair of tubular track members mounted in and extending across the upper sides of said intermediate portions on which said apparatus is supported during transportation; a take-off structure disposed to be positioned on either side of said railroad track including a pair of tubular side frame members disposed to abut the adjacent rail of said railroad track and to extend at right angles therefrom, a slotted foot member at the end of each of said last named side frame members for interfitting with the adjacent flange of said adjacent rail, tubular transverse frame members interconnecting said last named side frame members, a pair of tubular track members mounted above said last named side frame members and in alignment with said first named pair of track members to permit rolling of said apparatus between said carriage and said take-off structure, and a pair of adjustable tubular support members at the end of said take-off structure remote from said railroad track for adjusting the pair of track members carried thereby to substantially the same height as the pair of track members on said carriage; a J-shaped hook member for interfitting with the remote flange of said adjacent rail, and adjustable tension means interconnecting said hook member and one of the transverse frame members on said take-off structure for holding the latter in position.

11. Means for transporting welding or like apparatus mounted on wheels along and moving it from and to a railroad track comprising, in combination; a carriage including a pair of tubular side frame members with the intermediate portions below the level of the end portions, wheel and axle assemblies mounted on the upper sides of said end portions for running on said railroad track, tubular transverse frame members interconnecting said side frame members, and a pair of tubular track members mounted in and extending across the upper sides of said intermediate portions on which said apparatus is supported during transportation; a take-off structure disposed to be positioned on either side of said railroad track including a pair of tubular side frame members disposed to abut the adjacent rail of said railroad track and to extend at right angles therefrom, tubular transverse frame members interconnecting said last named side frame members, a pair of tubular track members mounted above said last named side frame members and in alignment with said first named pair of track members to permit rolling of said apparatus between said carriage and said take-off structure, and a pair of adjustable tubular support members at the end of said take-off structure remote from said railroad track for adjusting the pair of track members carried thereby to substantially the same height as the pair of track members on said carriage; and a pair of removable tubular track members disposed to have telescopic engagement with either end of the tubular track members on said carriage for interconnecting said pairs of track members whereby said apparatus may be rolled between said carriage and said take-off structure.

12. Means for transporting welding or like apparatus mounted on wheels along and moving it from and to a railroad track comprising, in combination; a carriage including a pair of tubular side frame members with the intermediate portions below the level of the end portions, wheel and axle assemblies mounted on the upper sides of said end portions for running on said railroad track, tubular transverse frame members interconnecting said side frame members, and a pair of tubular track members mounted in and extending across the upper sides of said intermediate portions on which said apparatus is supported during transportation; a take-off structure disposed to be positioned on either side of said railroad track including a pair of tubular side frame members disposed to abut the adjacent rail of said railroad track and to extend at right angles therefrom, a slotted foot member at the end of each of said last named side frame members for interfitting with the adjacent flange of said adjacent rail, tubular transverse frame members interconnecting said last named side frame members, a pair of tubular track members mounted above said last named side frame members and in alignment with said first named pair of track members to permit rolling of said apparatus between said carriage and said take-off structure and a pair of adjustable tubular support members at the end of said take-off structure remote from said railroad track for adjusting the pair of track members carried thereby to substantially the same height as the pair of track members on said carriage; a J-shaped hook member for interfitting with the remote flange of said adjacent rail, adjustable tension means interconnecting said hook member and one of the transverse frame members on said take-off structure for holding the latter in position, and a pair of removable tubular track members disposed to have telescopic engagement with either end of the tubular track members on said carriage for interconnecting said pairs of track members whereby said apparatus may be rolled between said carriage and said take-off structure.

13. Means for transporting welding or like apparatus mounted on wheels along and moving it from and to a railroad track comprising, in combination; a carriage including a pair of tubular side frame members having rectangular cross-sections and with the intermediate portions below the level of the end portions, wheel and axle assemblies mounted on the upper sides of said end portions for running on said railroad track, tubular transverse frame members interconnecting said side frame members, and a pair of tubular track members mounted in and extending across the upper sides of said intermediate portions on which said apparatus is supported during transportation; a take-off structure disposed to be positioned on either side of said railroad track including a pair of tubular side frame members disposed to abut the adjacent rail of said railroad track and to extend at right angles therefrom, a tubular corner post secured in a vertical position at right angles to each of said tubular side frame members at the ends of said side frame members remote from said rail, a slotted foot member at the other end of each of said side frame members for interfitting with the adjacent flange of said rail, tubular transverse frame members interconnecting said side frame members and said corner posts, a pair of tubular track members mounted above and in the plane of said tubular side members and secured at one end to said corner posts, a yoke at the other end of each of said track members, a pair of tubular support members telescoped in said corner posts, and means for holding said support members in different positions relative to said corner posts for adjusting the height of said last named track members; a J-shaped hook member for interfitting with the remote flange of said adjacent rail, turnbuckle means interconnecting said hook member and one of the transverse frame members on said take-off structure for holding the latter in position, and a pair of removable tubular track members disposed to have telescopic engagement with either end of the tubular track members on said carriage and to interfit with said yokes for interconnecting said pairs of track members whereby said apparatus may be rolled between said carriage and said take-off structure.

ARTHUR A. BERNARD.